UNITED STATES PATENT OFFICE.

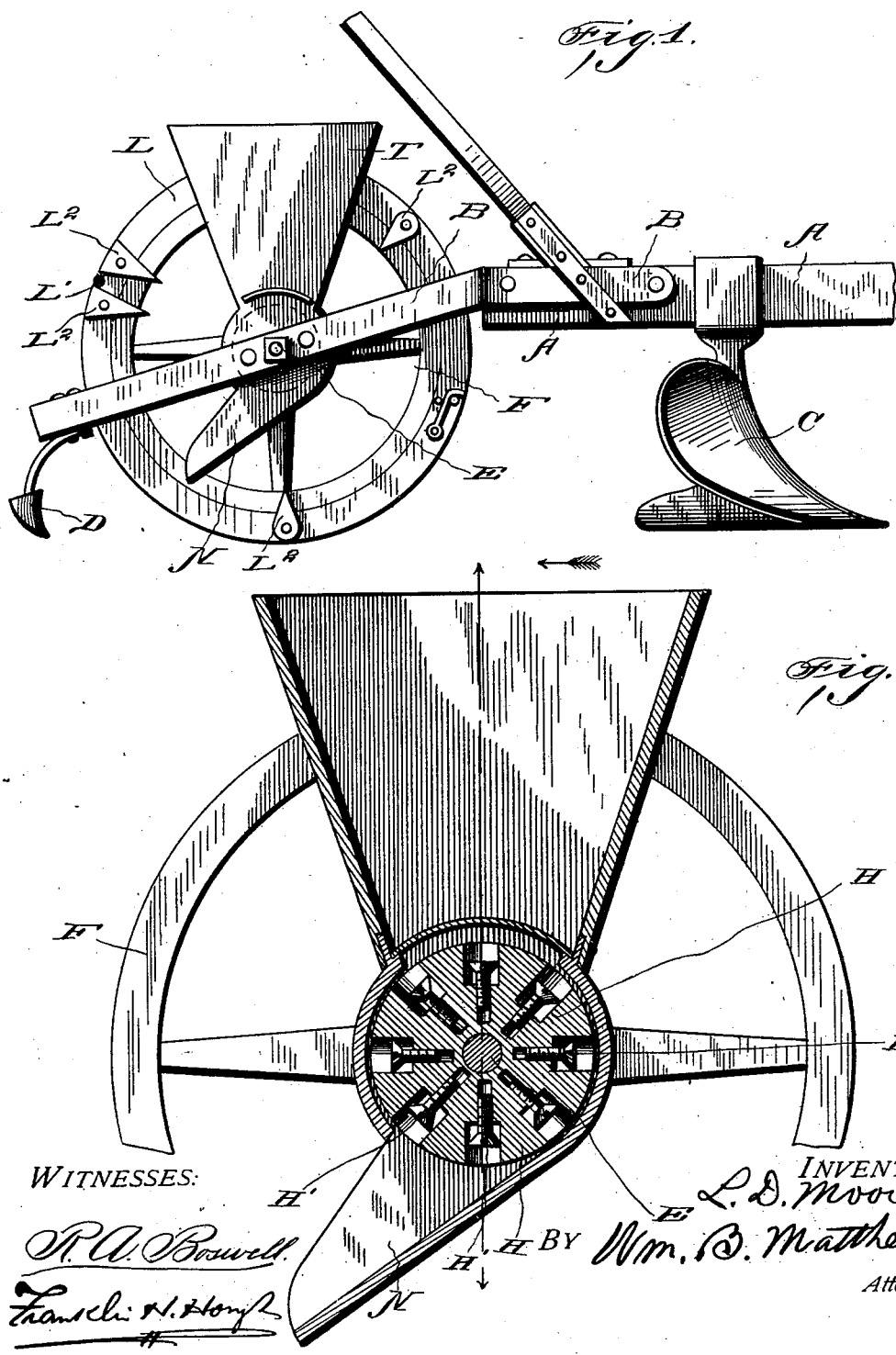

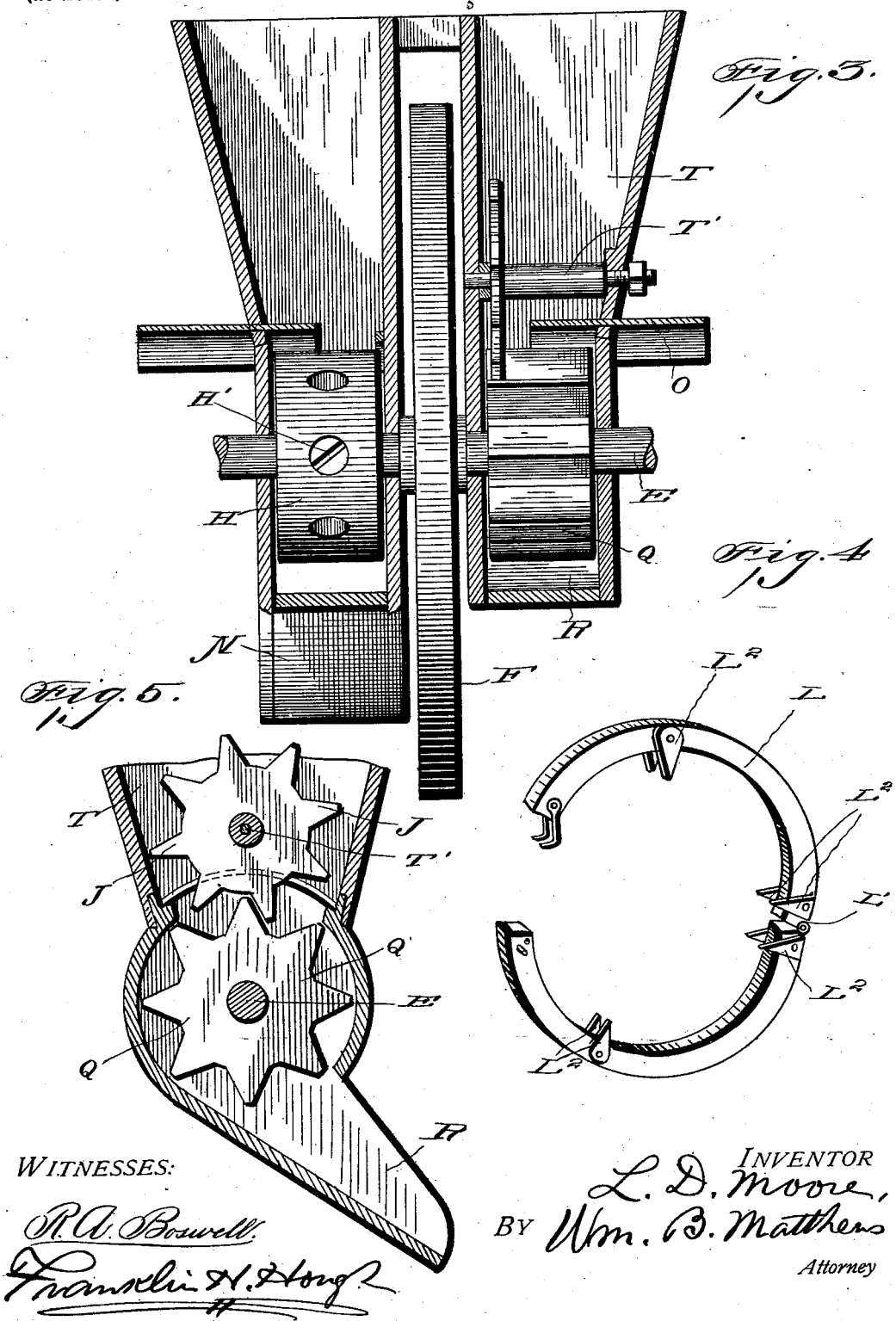

LLOYD D. MOORE, OF MACON, GEORGIA.

COMBINED SEEDER AND FERTILIZER-DISTRIBUTER.

SPECIFICATION forming part of Letters Patent No. 711,996, dated October 28, 1902.

Application filed March 21, 1902. Serial No. 99,293. (No model.)

*To all whom it may concern:*

Be it known that I, LLOYD D. MOORE, a citizen of the United States, residing at Macon, in the county of Bibb and State of Georgia, have invented certain new and useful Improvements in a Combined Seeder and Fertilizer-Distributer; and I do hereby declare the following to be a full, clear, and exact description of the invention, such as will enable others skilled in the art to which it appertains to make and use the same.

This invention relates to new and useful improvements in combined seeders, planters, and fertilizer-distributers; and it consists in the provision of simple means that may be attached to the beam of an ordinary plow, means being provided whereby the seed may be sowed in drills at uniform intervals and means also being provided for regulating the distance between which the seed is deposited by the provision of a hinged rim which is adapted to be fastened to the rim of the driving-wheel to temporarily increase its diameter.

The invention relates, further, to various details of construction, which will be hereinafter fully described, and then specifically defined in the appended claim.

The invention is clearly illustrated in the accompanying drawings, which, with the letters of reference marked thereon, form a part of this application, and in which drawings similar reference-letters indicate like parts wherever they occur in the several figures of the drawings, in which—

Figure 1 is a side elevation showing my attachment fastened to the beam of a plow. Fig. 2 is a view showing the attachment in section, parts being illustrated in elevation. Fig. 3 is a cross-sectional view through the seeder and fertilizer-distributer. Fig. 4 is a detail view showing the detachable rim for temporarily increasing the diameter of the driving-wheel, and Fig. 5 is a sectional view vertically through the fertilizer-distributer.

Reference now being had to the details of the drawings by letter, A designates the beam of an ordinary plow, to which are secured the two iron bars B, bolted to said beam in any suitable manner, and C designates the uncovering or furrow-opening shovel fastened to the plow-beam, and D indicates the covering-shovel fastened to the rear ends of said bars B. Journaled in said bars B is a shaft E, on which is keyed a wheel F, adapted to travel upon the ground, and secured to said shaft is a hub H, having a series of radial apertures therein, in each of which a headed screw H' is mounted, which is adapted to be screwed in or out, accordingly as it is desired to feed more or less seed, the outer face of the head of the screw forming the bottom of the pocket or recess in which the seed is fed from the seedbox. These radial apertures may be arranged at any intervals about the hub, accordingly as it is desired to feed the seed in drills at different distances apart. Leading from the casing surrounding said hub is an exit-spout N, provided to allow the seed to fall at intervals in the rear of the tread of the wheel immediately in front of the covering-shovel. Mounted upon the frame is a suitable seedbox from which the grain is fed to said apertured hub.

Rotating with the shaft E is a hub Q, having serrations Q' about its circumference in the shape of cog-teeth, and surrounding said hub is a casing having a spout R, through which the fertilizer is adapted to be deposited into the furrow.

Mounted upon the frame is a hopper T, in which the fertilizer is placed, and journaled in the walls of said hopper is a shaft T', having stirrer-arms J thereon, which are adapted to agitate the fertilizer, the ends of said arms being adapted to engage between the teeth or serrations of the circumference of the hub Q as the latter rotates, thus causing the fertilizer to be fed to the exit-spout. A slide O is provided at the outlet end of the hopper, whereby the amount of fertilizer being fed may be regulated, and also slides are provided for regulating the amount of seed which it is desired to feed to the disk wheel. When it is desired to drop the seed at greater intervals apart, I provide a detachable rim L, made of two semicircular ring-sections, hinged together at L' and having their free ends adapted to be fastened in any suitable manner. This rim has guide-plates $L^2$ at intervals about its inner circumference adapted to engage against the opposite edges of the wheel in order to hold said rim about the circumference of the wheel.

By my improved combined seeder and fertilizer-distributer it will be observed that I produce a machine in which sprocket-chains are dispensed with and in which the seed is deposited at regular intervals and also a fertilizer is fed in the furrow in which the seed is dropping, and the entire operation of uncovering the earth, dropping the fertilizer and seed, and covering the same is effected by one traverse of the apparatus over the ground.

Having thus fully described my invention, what I claim as new, and desire to secure by Letters Patent, is—

A combined seeder and fertilizer-distributer, comprising in combination with the plow-beam, bars extending rearwardly from said beam, a covering-shovel at the ends of said bars, a frame and seedbox, a shaft journaled in said bars, a hub with radial apertures therein, a headed screw mounted in each of said apertures, a second hub upon said shaft having serrations about its circumference, a fertilizer-box, a shaft mounted in said box and having radial arms adapted to engage the serrations about said hub and to be rotated thereby, and a casing about the serrated hub portion, and a spout leading from the casing, substantially as shown and described.

In testimony whereof I affix my signature in presence of two witnesses.

LLOYD D. MOORE.

Witnesses:
W. G. SMITH,
OLIVER ORR.